US012049002B2

(12) United States Patent
Munir et al.

(10) Patent No.: US 12,049,002 B2
(45) Date of Patent: Jul. 30, 2024

(54) SYSTEM AND METHODS FOR MONITORING MACHINE HEALTH

(71) Applicant: Robert Bosch GmbH, Stuttgart (DE)

(72) Inventors: Sirajum Munir, Pittsburgh, PA (US); Samarjit Das, Wexford, PA (US)

(73) Assignee: Robert Bosch GmbH (DE)

( * ) Notice: Subject to any disclaimer, the term of this patent is extended or adjusted under 35 U.S.C. 154(b) by 103 days.

(21) Appl. No.: 17/970,178

(22) Filed: Oct. 20, 2022

(65) Prior Publication Data

US 2024/0131734 A1    Apr. 25, 2024

(51) Int. Cl.
*B25J 19/02* (2006.01)
*B25J 19/06* (2006.01)

(52) U.S. Cl.
CPC .............. *B25J 19/021* (2013.01); *B25J 19/06* (2013.01); *G06F 2218/04* (2023.01); *G06F 2218/08* (2023.01); *G06F 2218/12* (2023.01)

(58) Field of Classification Search
CPC ..... B25J 19/021; B25J 19/06; G06F 2218/04; G06F 2218/08; G06F 2218/12
See application file for complete search history.

(56) References Cited

U.S. PATENT DOCUMENTS

| | | | |
|---|---|---|---|
| 9,892,744 B1* | 2/2018 | Salonidis | G05B 23/0237 |
| 2014/0039834 A1* | 2/2014 | Shibuya | G06F 11/22 |
| | | | 702/183 |
| 2016/0277863 A1* | 9/2016 | Cahill | G01S 3/8083 |
| 2019/0258894 A1* | 8/2019 | Zeng | G06V 10/806 |
| 2021/0096208 A1* | 4/2021 | Rittenschober | G01S 3/801 |

OTHER PUBLICATIONS

Thomas Drugman, Yannis Stylianou, Yusuke Kida, Masami Akamine, "Voice activity detection: Merging source and filter-based information", IEEE Signal Processing Letters, vol. 23, issue 2, pp. 252-256, 2017.
Wu, Wenqi, Yingjie Yin, Xingang Wang, and De Xu. "Face detection with different scales based on faster R-CNN." IEEE transactions on cybernetics 49, No. 11 (2018): 4017-4028.
Brandstein, Michael S., and Harvey F. Silverman. "A practical methodology for speech source localization with microphone arrays." Computer Speech & Language 11.2 (1997): 91-126.

(Continued)

*Primary Examiner* — Maurice L. Mcdowell, Jr.
(74) *Attorney, Agent, or Firm* — Dickinson Wright PLLC

(57) ABSTRACT

A system that includes one or more sensors installed in proximity to a machine configured to collect raw signals associated with an environment of the machine, are multi-layer spatial data that include time-stamp data. The system may include a processor in communication with the sensors and programmed to receive one or more raw signals, denoise the one or more raw signals to obtain a pre-processed signal, extract one or more features from the pre-processed signals, classify the one or more features to an associated class, wherein the associated class includes one or more of a normal class, abnormal class, or a potential-abnormal class, create fusion data by fusing the one or more features utilizing the associated class and the time-stamp data, and output a heat map on an overlaid image of the environment.

20 Claims, 8 Drawing Sheets

(56) References Cited

OTHER PUBLICATIONS

Aytar, Yusuf, Carl Vondrick, and Antonio Torralba. "Soundnet: Learning sound representations from unlabeled video." Advances in neural information processing systems. 2016, pp. 1-9.
Wei Dai, Chia Dai, Shuhui Qu, Juncheng Li, Samarjit Das, "Very deep convolutional neural networks for raw waveforms", IEEE International Conference on Acoustics, Speech and Signal Processing (ICASSP), 2017, pp. 1-5.
Zeng, Yunze, Parth H. Pathak, and Prasant Mohapatra. "WiWho: WiFi-based person identification in smart spaces." In 2016 15th ACM/IEEE International Conference on Information Processing in Sensor Networks (IPSN), pp. 1-12. IEEE, 2016.
RFCam: Uncertainty-aware Fusion of Camera and Wi-Fi for Real-time Human Identification with Mobile Devices. Hongkai Chen, Sirajum Munir, and Shan Lin. Accepted at Proceedings of the ACM on Interactive, Mobile, Wearable and Ubiquitous Technologies (IMWUT), Apr. 2022, pp. 1-29.
Shiwei Fang, Tamzeed Islam, Sirajum Munir, and Shahriar Nirjon. "EyeFi: Fast human identification through vision and Wi-Fi-based trajectory matching." In 2020 16th International Conference on Distributed Computing in Sensor Systems (DCOSS), pp. 59-68. IEEE, 2020.
You Only Look Once: Unified, Real-Time Object Detection. Joseph Redmon, Santosh Divvala, Ross Girshick, Ali Farhadi. https://arxiv.org/abs/1506.02640, pp. 1-10, May 9, 2016.
SSD: Single Shot MultiBox Detector. Wei Liu, Dragomir Anguelov, Dumitru Erhan, Christian Szegedy, Scott Reed, Cheng-Yang Fu, Alexander C. Berg. https://arxiv.org/abs/1512.02325, pp. 1-17, Dec. 29, 2016.
Faster R-CNN: Towards Real-Time Object Detection with Region Proposal Networks. Shaoqing Ren, Kaiming He, Ross Girshick, Jian Sun. https://arxiv.org/abs/1506.01497, pp. 1-14, Jan. 6, 2016.
Carreira, Joao, and Andrew Zisserman. "Quo vadis, action recognition? a new model and the kinetics dataset." proceedings of the IEEE Conference on Computer Vision and Pattern Recognition. 2017, pp. 1-10.
Simonyan, Karen, and Andrew Zisserman. "Very deep convolutional networks for large-scale image recognition." arXiv preprint arXiv:1409.1556 (2014), pp. 1-14.
He, Kaiming, et al. "Deep residual learning for image recognition." Proceedings of the IEEE conference on computer vision and pattern recognition. 2016, pp. 1-9.
Li, Chenning, Zheng Liu, Yuguang Yao, Zhichao Cao, Mi Zhang, and Yunhao Liu. "Wi-fi see it all: generative adversarial network-augmented versatile wi-fi imaging." In Proceedings of the 18th Conference on Embedded Networked Sensor Systems, pp. 436-448. 2020.
Qian, Kun, Chenshu Wu, Zheng Yang, Yunhao Liu, and Kyle Jamieson. "Widar: Decimeter-level passive tracking via velocity monitoring with commodity Wi-Fi." In Proceedings of the 18th ACM International Symposium on Mobile Ad Hoc Networking and Computing, pp. 1-10. 2017.
Brutti, Alessio, Maurizio Omologo, and Piergiorgio Svaizer. "Localization of multiple speakers based on a two step acoustic map analysis." In 2008 IEEE International Conference on Acoustics, Speech and Signal Processing, pp. 4349-4352. IEEE, 2008.
Qian, Kun, Zhaoyuan He, and Xinyu Zhang. "3D point cloud generation with millimeter-wave radar." Proceedings of the ACM on Interactive, Mobile, Wearable and Ubiquitous Technologies 4, No. 4 (2020), pp. 1-23.
Taha, Abdelrahman, Qi Qu, Sam Alex, Ping Wang, William L. Abbott, and Ahmed Alkhateeb. "Millimeter wave MIMO-based depth maps for wireless virtual and augmented reality." IEEE Access 9 (2021): 48341-48363.
Lu, Chris Xiaoxuan, Stefano Rosa, Peijun Zhao, Bing Wang, Changhao Chen, John A. Stankovic, Niki Trigoni, and Andrew Markham. "See through smoke: robust indoor mapping with low-cost mmwave radar." In Proceedings of the 18th International Conference on Mobile Systems, Applications, and Services, pp. 14-27. 2020.
Lu, Qiang, Mingjie Xiao, Yiyang Lu, Xiaohui Yuan, and Ye Yu. "Attention-based dense point cloud reconstruction from a single image." IEEE Access 7 (2019): 137420-137431.
Fan, Haoqiang, Hao Su, and Leonidas J. Guibas. "A point set generation network for 3d object reconstruction from a single image." In Proceedings of the IEEE conference on computer vision and pattern recognition, pp. 605-613. 2017.
Joglekar, Apoorva, Devika Joshi, Richa Khemani, Smita Nair, and Shashikant Sahare. "Depth estimation using monocular camera." International journal of computer science and information technologies 2, No. 4 (2011): 1758-1763.

\* cited by examiner

SYSTEM AND METHODS FOR MONITORING MACHINE HEALTH

TECHNICAL FIELD

The present disclosure relates to fusing of various sensors to monitor components in various settings.

BACKGROUND

Maintaining the health of plant machinery may be vital for smooth operation and continuous production of a manufacturing facility. An unexpected machine fault can be expensive as its downtime can halt the entire production process and obtaining maintenance service on short notice, which can be costly. To avoid such scenarios, a preventive maintenance mechanism is usually used, where machine health is monitored periodically. However, such manual system checks are costly in terms of labor and can be potentially hazardous. Also, during the manual health monitoring, the machine may not be used for actual production.

SUMMARY

A first embodiment a system that includes one or more sensors installed in proximity to a machine configured to collect raw signals associated with an environment of the machine, wherein the one or more sensors includes two or more of a microphone, camera, radio transceiver, inertial movement unit (IMU), or an accelerometer, wherein the signals are multi-layer spatial data that include time-stamp data. The system may include a processor in communication with the one or more sensors. The processor may be programmed to receive one or more raw signals collected from the one or more sensors, denoise, utilizing a filter, the one or more raw signals to obtain a pre-processed signal, extract one or more features from the pre-processed signals, wherein the one or more features are associated with the signals from the microphone, camera, radio frequency transceiver, IMU, or the accelerometer, classify the one or more features to an associated class, wherein the associated class includes one or more of a normal class, abnormal class, or a potential-abnormal class, create fusion data by fusing the one or more features utilizing the associated class and the time-stamp data, and output a heat map on an overlaid image of the environment, wherein the heat map includes information indicative of an associated health of a specific component of the machine utilizing the fusion data.

A second embodiment discloses a computer-implemented method that includes receiving one or more raw signals collected from the one or more sensors installed in proximity to a machine configured to collect raw signals associated with an environment of the machine, wherein the signals are utilized to generate multi-layer spatial maps and include time-stamp data; denoising, utilizing a filter, the one or more raw signals to obtain a pre-processed signal; extracting one or more features from the pre-processed signals, wherein the one or more features are associated with the signals from the microphone, camera, radio frequency transceiver, IMU, or the accelerometer; classifying the one or more features to an associated class, wherein the associated class includes one or more of a normal class, abnormal class, or a potential-abnormal class; creating fusion data by fusing the one or more features utilizing the associated class and the time-stamp data; and outputting a heat map on an overlaid image of the environment utilizing the multilayer spatial maps, wherein the heat map includes information indicative of an associated health of a specific component of the machine utilizing the fusion data.

A third embodiment discloses a system for monitoring automated robotic system. The system includes one or more sensors installed in proximity to a machine configured to collect raw signals associated with an environment of the machine, wherein the one or more sensors includes one or more of a microphone, camera, radio frequency transceiver, inertial movement unit (IMU), or an accelerometer, wherein the raw signals are multi-layer spatial maps include time-stamp data. The system includes a processor in communication with the one or more sensors, wherein the processor is programmed to receive one or more raw signals collected from the one or more sensors, denoise, utilizing a filter, the one or more raw signals to obtain a pre-processed signal, extract one or more features from the pre-processed signals, wherein the one or more features are associated with the signals from the microphone, camera, radio frequency transmitter, IMU, or the accelerometer; identify either a normal condition associated with the environment or an anomaly associated with the environment utilizing the one or more features to an associated class, wherein the anomaly is detected in response to a deviation from a threshold associated with the one or more features, create fusion data by fusing the one or more features utilizing the anomaly detected, and output a heat map on an overlaid image of the environment, wherein the heat map includes information indicative of an associated health of a specific component of the machine utilizing the fusion data.

DETAILED DESCRIPTION

Figure 1:
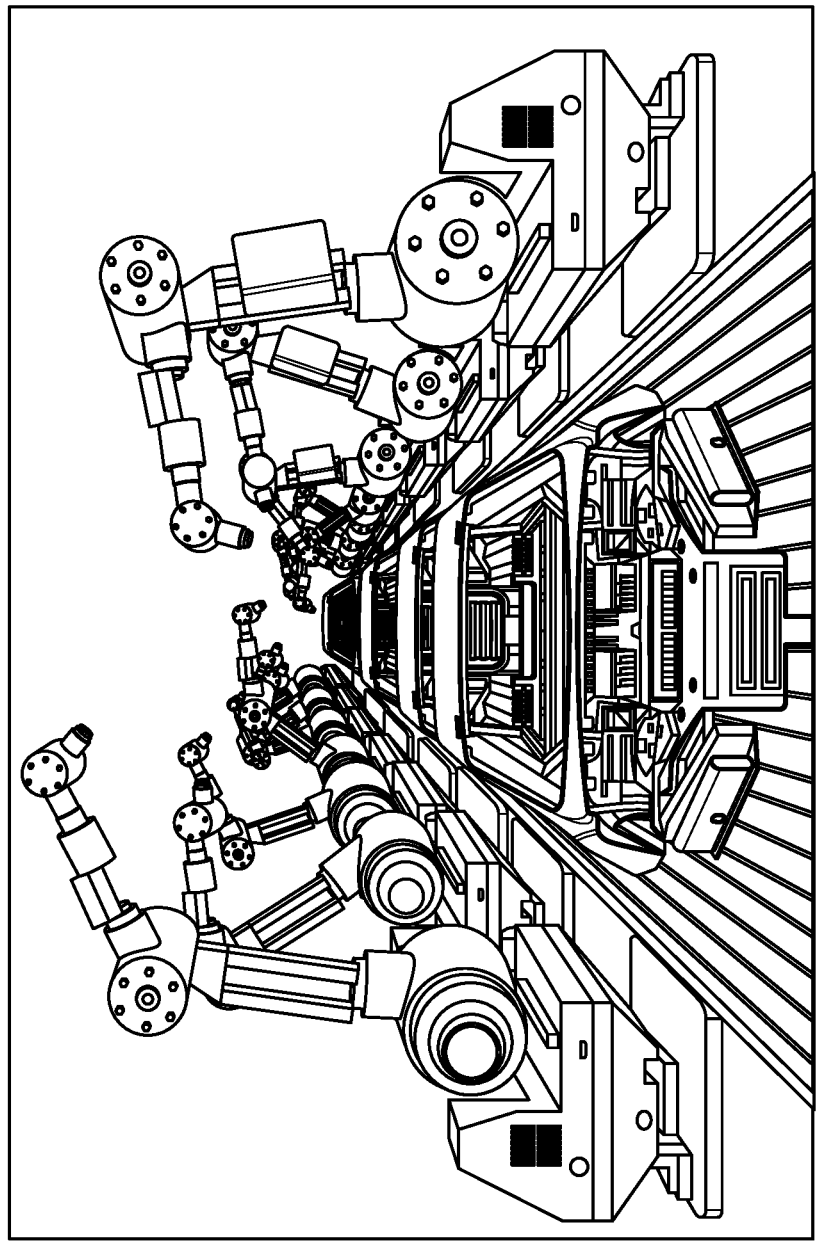
FIG. 1 illustrates an embodiment of a manufacturing facility or environment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Existing multimodal monitoring of machine state and health may use internal movement units (IMUs), vibration, current flow, pressure/flow rate, etc, and uses signal patterns to automate the process of health monitoring. Such sensing systems have limited spatio-temporal information with respect to the machine structure and its systems/components limiting potentially crucial information about machine health. For example, compared to mono or stereo audio signals acquired from a machine, a system that may utilize an acoustic camera to look at the same machine, the spatial mapping of sound intensities will embed more detailed clues about machine functional state with respect to different machine parts and components. Similarly, a system and method could use such spatial mapping of other modalities e.g., radio frequency (RF) or visual cues. The novelty of such a system may include that it can input multilayer 2D/3D spatial maps coming together from acoustics, RF, and vision to ML-based system health analytics compared to existing approaches that rely on the 1D signal coming from a single or a limited number of points. The spatial maps with RF/acoustics/visual signatures give a new perspective to monitor machines and sense their functional health that existing solutions lack. The system described below can also be complementary to the existing multimodal sensing setup for machine health monitoring and thereby improving preventive maintenance capabilities across various domains and increasing cost savings. If a machine exhibits anomalous behavior, it can be automatically detected and reported, and maintenance can be planned.

The health of machines in manufacturing facilities may be critical for the success of the modern manufacturing industry. An unexpected machine fault can be expensive as its downtime can halt the entire production process and obtaining maintenance service on short notice can be costly. To avoid such scenarios, a preventive maintenance mechanism is usually used, where machine health is monitored periodically by humans. However, such manual system checks are costly in terms of human labor and can be potentially hazardous. Also, during the manual health monitoring, the machine may not be used for actual production. Although there are some existing works for utilizing various types of sensors (IMUS, vibrations, etc.) for detecting machine anomalies, the main novelty of our work is to integrate spatial mapping from acoustic, RF, and vision to detect machine anomalies automatically. In other words, the disclosure not only focuses on the machine-learning for anomaly detection but also focuses on generating the multimodal, spatio-temporal input to be fed to anomaly detection or machine state classification algorithms. Such input can capture more subtle cues of machine functional states with respect to different machine parts and components. As a result, the proposed solution is more robust for anomaly detection as well as more inexpensive to deploy. In that way, if a machine exhibits anomalous behavior, it can be automatically detected and reported, and maintenance can be planned.

The proposed approach is not limited to monitoring health of machines in manufacturing plants, but can be potentially useful to monitor health conditions of machines in other areas including HVAC systems, water heat pump in residential and commercial spaces. The system may overcome such limitations by deploying different types of sensors (acoustic, RF, and camera), and estimate multilayer 2D/3D spatial maps from the input of the sensing modalities, feed the spatial maps to ML-based classifiers to determine machine anomaly.

FIG. 1 illustrates an embodiment of a manufacturing facility. The facility may include a product that it creates utilizing robotics machine. The robotic machines may be fully automatic or have some human operation. The robotic machines may include numerous, numerous components. The manufacturing facility may create any type of products, such as a vehicle, engine, motor, truck, home and garden equipment, watercrafts, etc. The facility may utilize an assembly line.

The robots or machines that may be utilized include any type of robot utilized in a manufacturing facility or assembly line. The main robot types may include those to automate assembly applications, such as a six-axis, delta, SCARA, and collaborative robots. Six-axis articulated robots may provide a wide range of motion for assembly tasks with their six degrees of freedom. The robots may be able to range from light payloads for smaller part assemblies to heavier payloads, allowing for heavier EOAT and larger parts. For example, a FANUC M20ia may be a six-axis robot for automating assembly tasks. Delta robots are ideal for lightweight assemblies, since their payloads are much less than other robots. Their slim parallel link arms and motorized base allows delta robots to operate with incredible speed and precision. This makes them ideal for intricate, high-speed assemblies. FANUC's M-3ia is a top choice for automating assembly lines.

The robot or machine may have multiple components or parts that create the entire robot. For example, the robot may include one or more arms that swing. The robot may include a tip as well, and arms, wrists, and joints. The arm may be cable of having an end effector mounted on or connected to it. At a high-level, the robot may include a manipulator, end effector (e.g., components for welding, measuring, marking, drilling, cutting, painting, cleaning, etc.), feedback device (e.g., limit switches, actuated by the robot's arm or position-measuring devices such as encoders, potentiometers, resolvers, and/or tachometers), controller, and locomotive device (e.g., pneumatic, electric, and hydraulic motors are the three most popular types of motors used in robot movement).

In one example, the robots may have four axes and are best for small assembly processes. Four axis robots lack the range of motion of a six-axis robot, but they can perform assemblies involving moving from one point to another. However, since they have fewer joints, they can operate at high speeds and are considered one of the fastest robot types. Collaborative robots are unique because they can work alongside humans without barriers. This allows them to directly assist humans with assembly jobs. They can perform the assembly themselves, assist when parts are too intricate for human handling, or help retrieve parts for workers to speed up the assembly process.

Figure 2:
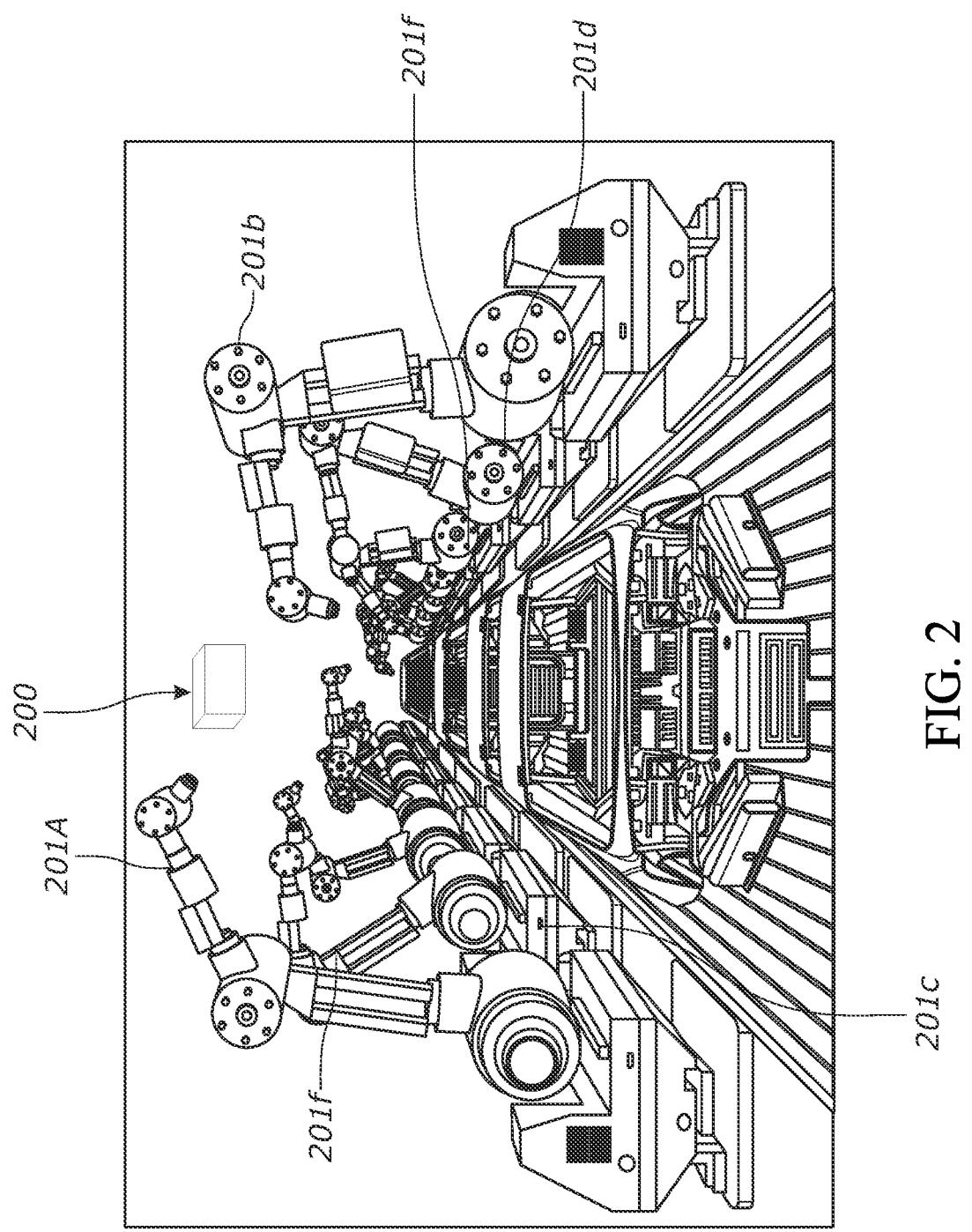
FIG. 2 illustrates an embodiment of a manufacturing facility or environment equipped with an embodiment of a single sensing unit.

FIG. 2 illustrates an embodiment of a manufacturing facility with a single sensing unit. An example of such an instrumentation is shown in FIG. 2, where a sensing unit 200 is installed to monitor machine status of several neighboring machines 201*a*, 201*b*, 201*c*, 201*d*, 201*e*, 201*f*. Details of the sensing unit are discussed in more detail below. The sensing unit S1 may contain acoustic sensors, cameras, and Radio Frequency (RF) sensors including radar, Wi-Fi, Bluetooth, Ultra-wide band etc. In addition, S1 may also include vibration sensors, Inertial Measurement Units (IMUs), etc.

Figure 3:
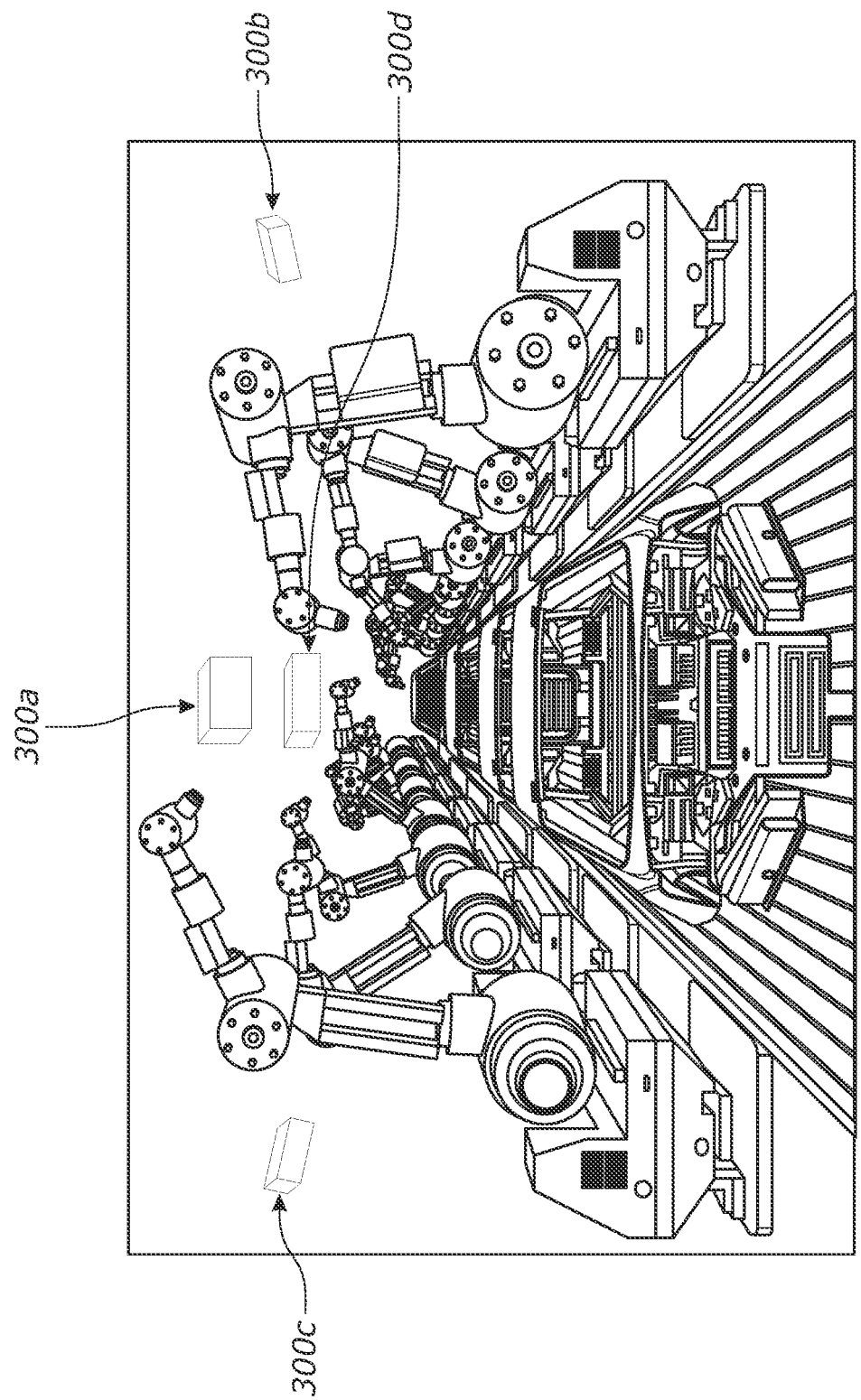
FIG. 3 illustrates an embodiment of a manufacturing facility or environment equipped with an embodiment of multiple sensing units.

FIG. 3 illustrates an embodiment of a manufacturing facility with multiple sensing units. Multiple sensing units (300a, 300b, 300c, 300d) can be deployed to monitor machine health as shown in this illustrative embodiment. When multiple units are installed, each of the sensing units 300a, 300b, 300c, 300d may have different responsibilities, in one example. For example, one sensor may be configured to transmit RF signals, another senor may be configured to receive RF UQ values, Channel State Information (CSI), or Channel Impulse Response (CIR). When installing the units, their location can be determined as associated with the critical component of the machines in the factory that they intend to monitor. There can be a higher likelihood of installing a sensing unit next to a component that is more critical and has more potential chance of a failure. As such, the closer the sensing units is to that component, the more accurate the data may be that is retrieved. The sensing units can be covered or uncovered. Thus, they may be visible or difficult to see from a user.

Figure 4:
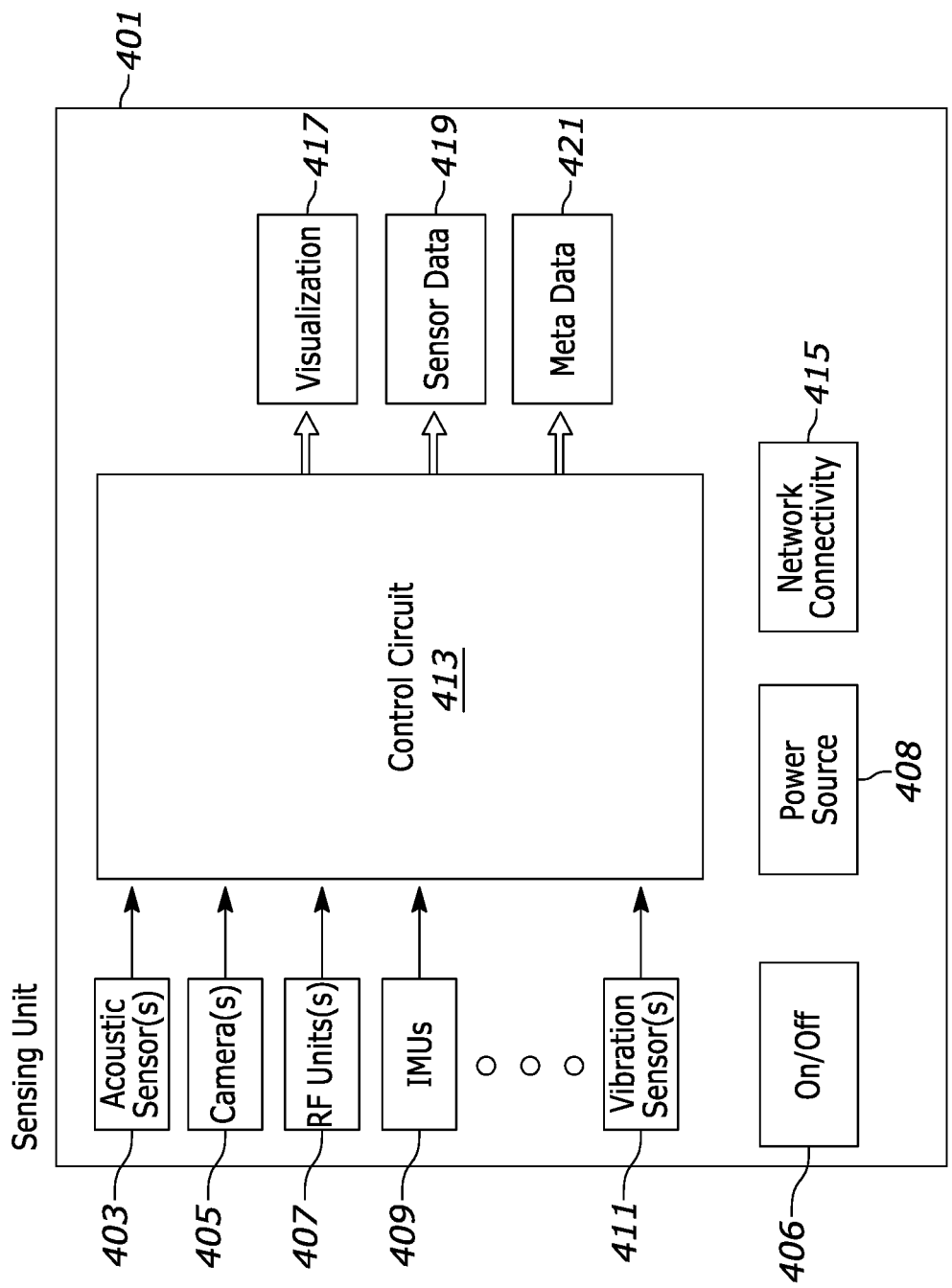
FIG. 4 illustrates an embodiment of an overview schematic of a sensing unit.

FIG. 4 illustrates an overview schematics of the sensing units. The components of a sensing unit 401 are shown in FIG. 4. The sensing unit 401 may contain different types of sensors, e.g., acoustic sensor(s) 403, camera(s) 405, RF unit(s) 407, IMUs 409, and vibration sensors 411. In other embodiments, a Lidar, radar, or other sensors may be utilized. The various sensors may collect data from the machine and associated components in the factory environment. The sensors may be in communication with the control circuit 413. The data may be processed in the control circuit 413, which may include one or more processors, controllers, etc. The processing may be utilized to facilitate the health condition in the visualization screen, which can be in communication with the sensing unit 401. Also, the sensing unit 401 may have the capability for both long-range or short-range network connectivity. The transceiver for network connectivity 415 may be connected to a centralized server. The data may be communicated back/and forth to a remote server utilizing the transceiver for network connectivity 415. The raw sensor data, 2D/3D spatial maps, metadata, or several of these may all be communicated. The communication transceiver or the network connectivity module may use Ethernet, Wi-Fi, Bluetooth, 5G, 6G or cellular connection. Then, the centralized server may use such data from several sensing units to determine potential health issues of a particular machine. There is also a power source and an on/off button attached to a sensing unit to turn it on or off.

The sensing unit 401 may include a separate power button 406. The power button 406 may be utilized to toggle between an on and off setting. The power button 406 may be utilized remotely through the transceiver connection 415 to remote shut off or power on the sensing unit 401. Thus, even when powered off, the sensing unit 401 may have a sleep mode or enough power to utilize the communication network. The sensing unit 401 may include a power source 406 that may include batteries, hard-wire connection, solar energy, etc. The on/off button 406 may communicate with the power source 408 to toggle between powers.

The control circuit 413 may be utilized to process and communicate the various sensor data. For example the visualization 417 may include a heat map or health condition report based on the sensor data processed. The visualization 417 may utilizes images and other data caught from the camera 405 or other sensors to create a heat map. For example, information may be overlaid an image obtained from camera 405. The control circuit 413 may process such data to create the heat map or other visualization techniques to identify a potential critical event.

The sensing unit 401 may utilize metadata 421 associated with the various data collected by the internal sensors to help with fusion. For example, the metadata 421 may include a time stamp, location information, sensor information, or other data associated with the sensors raw data. The metadata 421 may be utilized to identify where the signals or spatial map information may have been derived from and at what time.

Figure 5A:
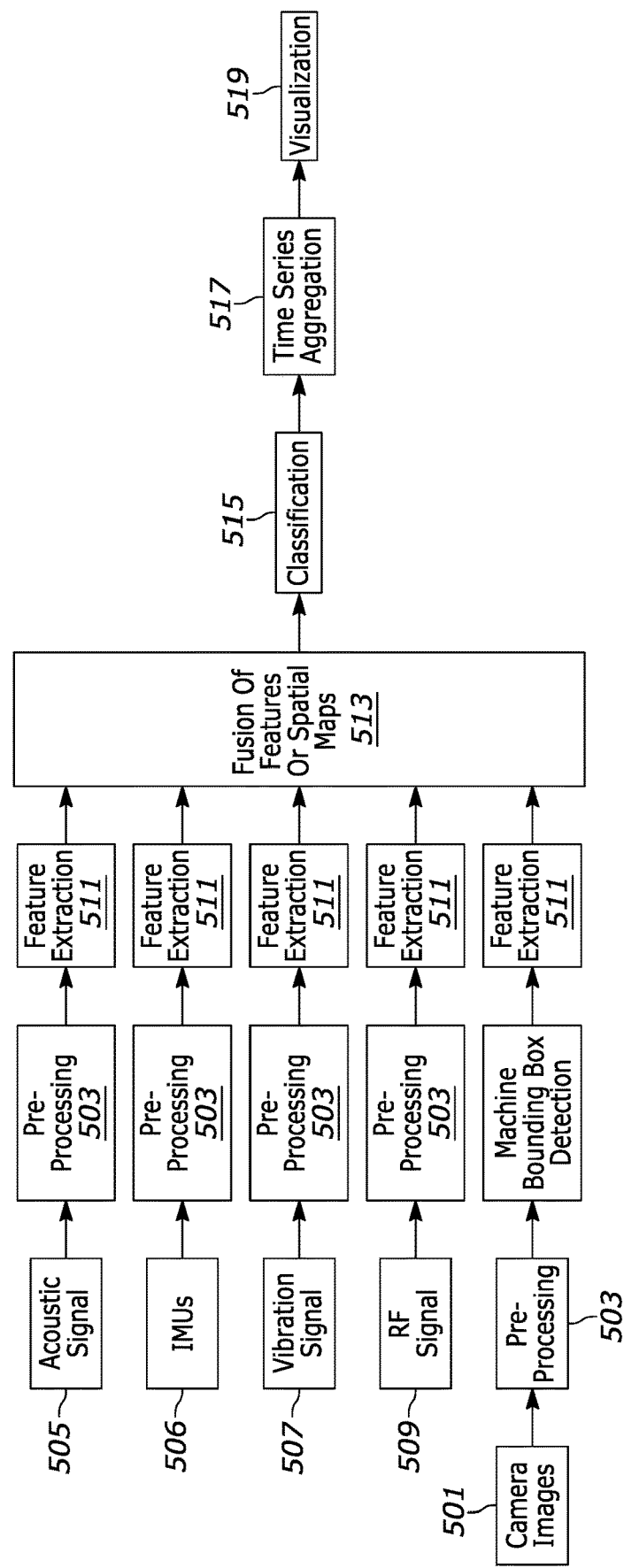
FIG. 5A illustrate an embodiment of a computing pipeline for early fusion of features utilizing a classification-based approach.
Figure 5B:
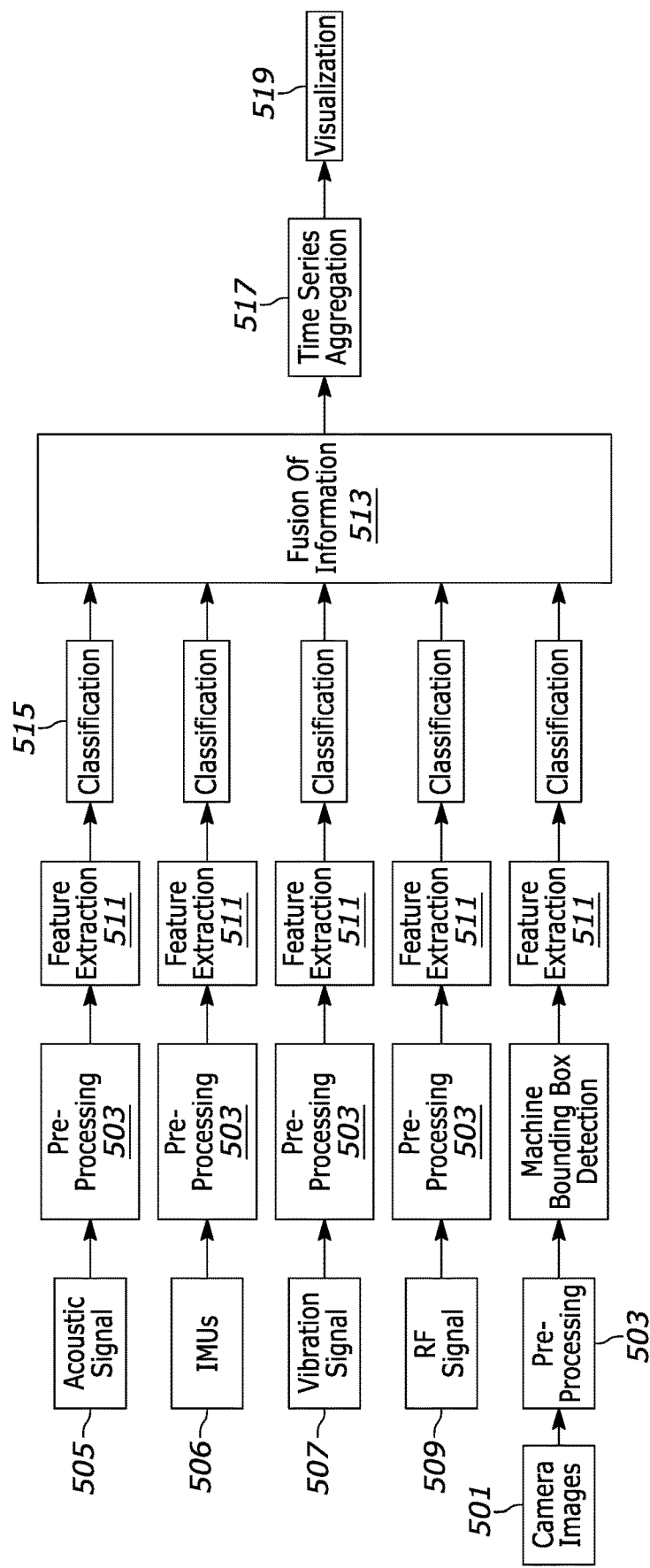
FIG. 5B illustrate an embodiment of a computing pipeline for late fusion of features utilizing a classification-based approach.

FIG. 5A illustrate an embodiment of a computing pipeline for early fusion of features utilizing a classification-based approach. FIG. 5B illustrates an embodiment of a computing pipeline for late fusion of features utilizing a classification-based approach. As discussed in further detail, the system and method may utilize a classification approach. In this embodiment, each health-related issue of one or more machines in the factory may be represented as a class. The system may also utilize a class for normal health condition. Utilizing different sensors, the system may collect relevant features from each window of sensing period and then classify the window using a classifier, e.g., an SVM, random forest, a multilayer perceptron, RNN, or LSTM. After the classification is performed, the classification result shows whether the machine has normal health condition or has a potential fault. The classification result may also describe the type of health issue, e.g., bearing misalignment of an induction motor based on the class with the highest confidence score. The solution may also display a numerical score of the health status based on the confidence score from the classification task.

The system may take various steps to monitor machine health and determine potential health issues. At step 501, the system may utilize the sensor to capture various camera images, video, or other types of images. The signals captures by the various sensors may include 2D or 3D spatial maps or spatial data. At block 503, the system may begin pre-processing such images. At block 503, the captured raw signals and data may be denoised using different types of filters, e.g., low-pass, high-pass, and band-pass filters. In one embodiment, the signals may be segmented using a sliding window algorithm, or a similar type of system. Privacy preserving audio processing may be used to comply with user privacy requirements (e.g., selectively cancel/reject human speech from continuous audio stream by speech activity detection algorithms). Similarly, human faces can be detected using camera images and can be blurred in another embodiment.

After one or more sensing unit(s) are installed near to the machine of interest, the system may continuously sense the surrounding environment at their respective sampling rate. As such, the sensing unit may communicate and collect continuous acoustic signals 505, camera RGB images 507, RF signals 509 (e.g., I/Q values, Channel State Information, Channel Impulse Response) for analyzing machine health. It may also include IMU data 506, vibration data 507. The IMU data 506 may be collected from gyroscopes or other MEMs sensors. The vibration data 507 may be collected from one or more accelerometers or another type of sensor.

At block 511, the processor or controller may conduct feature extraction from all data derived from the pre-processing of the various sensors and data. Each sensor may utilize a different type of feature extraction method or identify a different type of feature. At the feature extraction block 511, relevant features of each modality (e.g., sensor) may be extracted for analysis for each sliding window. For the acoustic sensors, spatial maps may be generated using utilized. In addition to spatial maps, Mel Frequency Cepstral Coefficients (MFCC), SoundNet CNN, time domain features, frequency domain features, acoustic imaging features, or a combination of these can be used.

For the RF units, spatial maps may be generated using, or imaging features are generated. Further more, the spatial maps or features may be generated using 3D point could generation with millimeter-wave radar, millimeter wave MIMO-based depth maps for wireless virtual and augmented reality, or robust indoor mapping with low-cost mmwave radar. In addition to spatial maps, time and frequency domain statistical features can be used based on the extracted amplitude and phase information of Channel State Information, or I/Q data associated with the received RF signals. Some examples of time domain features can be min, max, average, median, range, skewness, kurtosis, interquartile range of the amplitude. Some examples of frequency domain features can be FFT peaks, entropy, or Doppler Frequency Shift. Alternately, instead of using the statistical features, an embedding can be learned to extract the features. For example, CSI2Vec, or a neural network-based architecture to extract features. Alternately, a combination of statistical features and learned embedding based features can be used together. Alternately, pre-processed amplitude and phase from the received signal can be used as features.

For the cameras, spatial maps may be generated using monocular cameras, or depth cameras 501, e.g., Microsoft Kinect, or Intel RealSense, etc. may be used for pre-processing 503. Alternately, machines are detected first using object detection techniques, e.g., YOLO, SSD, Faster RCNN. The object detection techniques may provide bounding boxes around each machine. Then, relevant visual features may be extracted from each machine for their health monitoring. To capture the spatiotemporal features, 2D convolutional network can be inflated to 3D convolutional network and I3D features can be used. Alternately, deep convolutional network like VGG16, ResNet can be used to extract spatial features and later integrated into an LSTM-based network for machine health monitoring.

For IMUS 506 and vibration sensor 507, time and frequency domain statistical features can be used for pre-processing 503. Some examples of time domain features will be min, max, average, median, range, skewness, kurtosis, interquartile range, etc. Some examples of frequency domain features can be FFT peaks, entropy, etc. Alternately, instead of using the statistical features, an embedding can be learned to extract the features using a neural network-based architecture. Alternately, a combination of statistical features and embedding based features can be used together. Alternately, pre-processed sensor data can be used as features.

At block 513, the system may fuse all of the features that were extracted from the various features. The extracted features from each modality (acoustic, RF, camera, IMUS, vibration) can be fused before feeding to the classifier as shown in the computing pipeline in FIG. 5. Here, feature vectors from different modalities are concatenated before feeding to the classifier. This approach is called early fusion. Alternately, there can be one classifier for each associated signal. At block 513, the system may fuse all the information that is collected. This may include fusion of the features or fusion of spatial maps, or any other data or signals. In the fusing of information block 513 in FIG. 5B and FIG. 6B, a majority voting from the classifiers, along with their confidence score, may be used to make a final decision about the classification result of the segment. The approach may also be utilized in a late fusion-based approach, or when the fusion occurs after classification or anomaly detection.

At block 515, the system may utilize classification 515 of the data. At this step, a classifier is used to classify each sliding window. For this classification purpose, an SVM, random forest, or multilayer perceptron classifier can be used. Also, a Recurrent Neural Network (RNN) and its variants like Long Short Term Memory (LSTM) can also be used. The classifier will classify the sliding window to a set of classes including a healthy class and two classes for each type of fault of interest. Among these two classes per fault of interest, one class capture the specific fault that has already happened, and the other class captures potential future fault. Prior to this classification, the classifier is trained using collected data covering all the classes of interest. It can be done by manually injecting the faults while collecting data, or using historical data associated with a fault that happened naturally. Separately, with respect to FIG. 5B, the modality and the findings from the classifiers can be fused later as shown in FIG. 6. The computation of the classification can be performed locally within the sensor unit at the control circuit (e.g., processor, controller, etc.). In an alternative embodiment, the computation may be done remote at a server. Thus, data may be communicated remotely utilizing the wireless transceiver. Thus, each sensor unit may be able to upload the raw sensor data, extracted features, including spatial maps, and/or meta data (e.g., timestamps) to a central server utilizing the transceiver, and the centralized server can run the classifiers to determine classification.

At block 517, time-series aggregation or a similar process may be conducted. At this step, health condition detected throughout the entire sensing period may be aggregated. The sensing period can be defined by any time period, such as 24 hours, or it can be configured based on the operation of a machine. As an example, the sensor may calculate how many times the machine showed a case of rotor fault. It can be used to improve the detection (e.g., by discarding sporadic detection of incorrectly classified events by doing a majority voting). Also, it can be used to provide a summary of the health condition detected from the entire sensing period.

At block 519, the system may output visualization associated with the data collected and fused at the sensing unit. At this block, the aggregated information is shown to the stakeholder. It can be shown at a display next to the machine, or in an app of a smartphone, or in a browser in a desktop/laptop. If the health condition is critical, it can be shown immediately without doing the time-series aggregation. The visualization may include an image of a machine with information overlaid onto the components that are unhealthy or are healthy. For example, the system may identify an exact component that has issues with a red circle, or red shading overlaid on an image of that component. For example, that component of the machine (e.g., elbow, motor, hands, etc.).

Figure 6A:
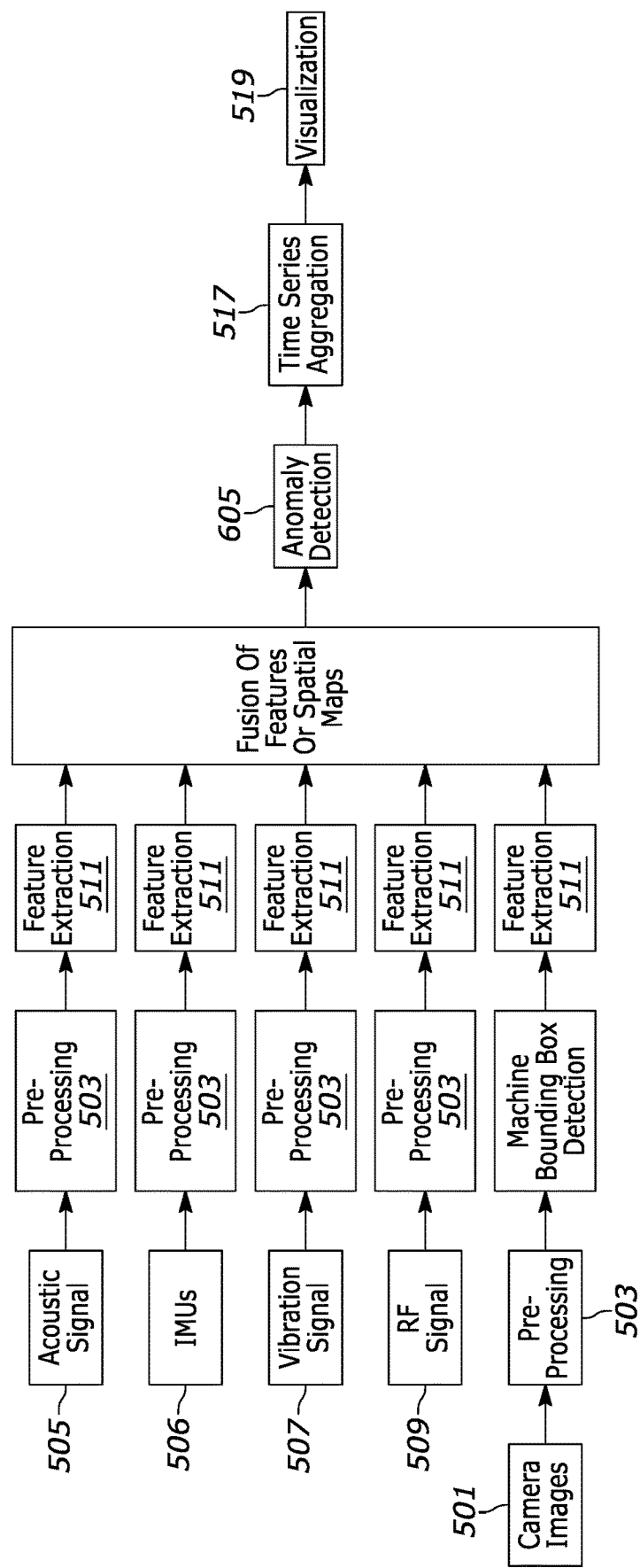
FIG. 6A illustrate an embodiment of a computing pipeline for early fusion of features utilizing an anomaly detected-based approach.
Figure 6B:
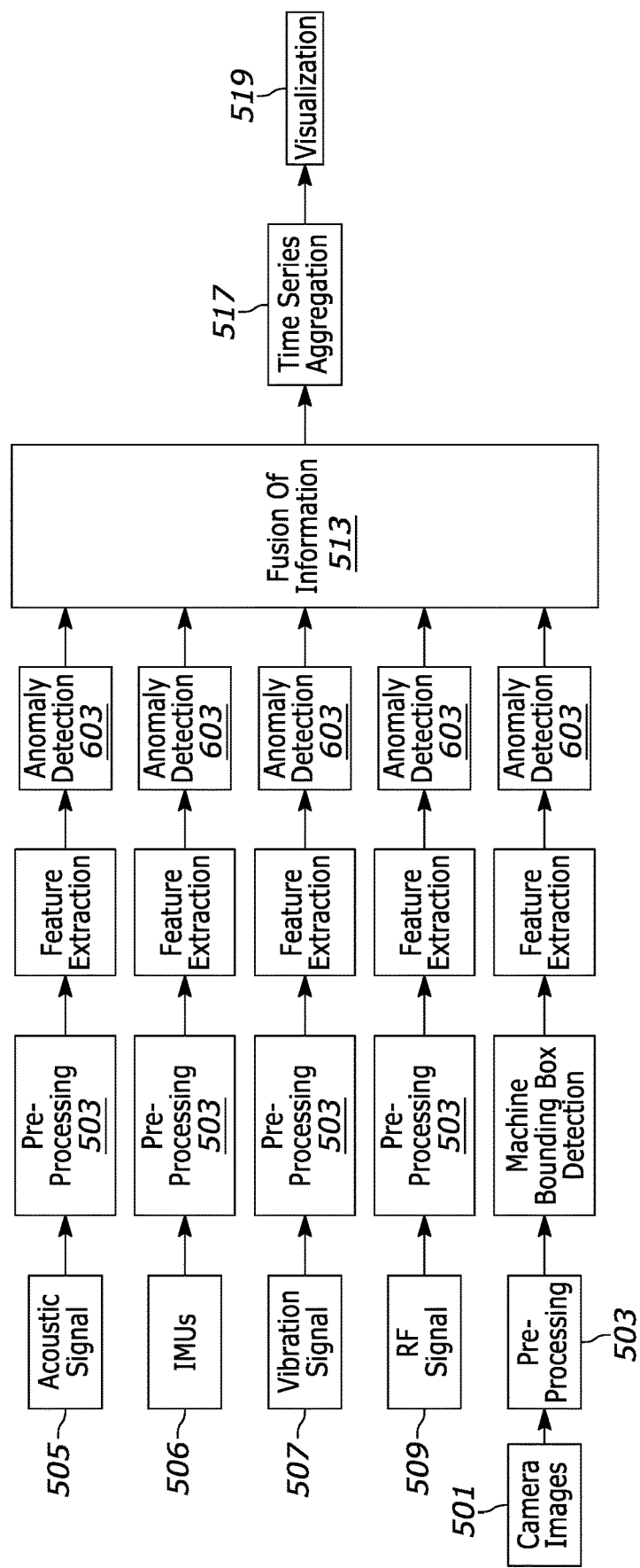
FIG. 6B illustrate an embodiment of a computing pipeline for late fusion of features utilizing an anomaly detected-based approach.

FIG. 6A illustrate an embodiment of a computing pipeline for early fusion of features utilizing an anomaly detected-based approach. FIG. 6B illustrate an embodiment of a computing pipeline for late fusion of features utilizing an anomaly detected-based approach. The data collection utilizing anomaly detected-based approach may be similar. In the embodiments that involve the clustering-based approach, the system may not train a classifier for each type of machine fault. Instead, the system may instead be instead programmed to train on understanding normal operations and normal health conditions. Thus, the system may focus on learning the normal health condition and detect deviation from the normal health parameters. The steps for detecting machine faults may utilize an approach similar to those discussed above with respect to FIGS. 5A and 5B. However, in the case of early fusion utilizing anomaly detection based approach, the system may utilize an anomaly detection at block 603. The anomaly detector may detect deviation from normal health conditions using the features extracted from block 511. If the deviation is beyond a threshold or a set of thresholds, then the system may identify the features as an anomaly. The anomaly may be reported. The system may utilize features of normal health condition and anomalous health conditions. The features may bee fed to a clustering algorithm to tune its parameters to cluster normal health condition from other situations. With respect to the clustering algorithm, DBScan, K-means, Agglomerative clustering, spectral clustering, one-class SVM, Gaussian Mixture Model, and auto-encoders, or other clustering algorithm can be used. As shown in FIG. 6A, the system may utilize early fusion and thus fuse the feature or spatial maps that are collected at block 513. As shown in FIG. 6B, the system may utilize late fusion and thus fuse late at block 513 in response to the various anomalies detected at block 603.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:
one or more sensors installed in proximity to or on a machine configured to collect raw signals associated with an environment of the machine, wherein the raw signals are utilized to generate multilayer spatial maps that include time-stamp data, and wherein the raw signals are generated from a microphone, a camera, a radio frequency transmitter, an inertial movement unit (IMU), or an accelerometer;
a processor in communication with the one or more sensors, wherein the processor is programmed to:
receive one or more of the raw signals from the one or more sensors;
denoise, utilizing a filter, the one or more raw signals to obtain a pre-processed signal;
extract one or more features from the pre-processed signal;
classify the one or more features to an associated class, wherein the associated class includes one or more of a normal class, abnormal class, or a potential-abnormal class;
create fusion data by fusing the one or more features utilizing the associated class and the time-stamp data; and
utilize the fusion data to output a heat map on an overlaid image of the environment generated utilizing the multilayer spatial maps, wherein the heat map includes information indicative of an associated health of a specific component of the machine utilizing the fusion data.

2. The system of claim 1, wherein the one or more sensors includes one sensor, wherein the one sensor includes all of the acoustic sensor, camera, radio frequency transceiver, inertial movement unit (IMU), or an accelerometer.

3. The system of claim 1, wherein the one or more sensors includes two or more sensors including a first sensor and a second sensor, wherein the first sensor includes a first type of sensor, and the second sensor includes a second type of sensor, wherein the first type of sensor and the second type of sensor are different types of sensors.

4. The system of claim 1, wherein the filter includes a low-pass, high-pass, and band-pass filter.

5. The system of claim 1, wherein the processor is programmed to fuse the one or more features after classifying the one or more features.

6. The system of claim 1, wherein the processor is programmed to output a time-series aggregation associated with a time period.

7. The system of claim 1, wherein the processor is programmed to fuse the one or more features before classifying the one or more features.

8. The system of claim 1, wherein one or more features associated with the microphone includes a spatial map, Mel Frequency Cepstral Coefficients (MFCC), SoundNet Convolutional Neural Network, time domain features, frequency domain features, or acoustic imaging features.

9. The system of claim 1, wherein the multilayer spatial maps are 2D spatial maps or 3D spatial maps.

10. The system of claim 1, wherein extracting one or more features includes utilizing time domain features, object detection, or frequency domain features.

11. A computer-implemented method, including:
receiving one or more raw signals collected from the one or more sensors installed in proximity to a machine configured to collect raw signals associated with an environment of the machine, wherein the raw signals are utilized to generate multi-layer spatial maps and include time-stamp data, and wherein the raw signals are generated from a microphone, a camera, a radio frequency transmitter, an inertial movement unit (IMU), or an accelerometer;
denoising, utilizing a filter, the one or more raw signals to obtain a pre-processed signal;
extracting one or more features from the pre-processed signals;
classifying the one or more features to an associated class, wherein the associated class includes one or more of a normal class, abnormal class, or a potential-abnormal class;
creating fusion data by fusing the one or more features utilizing the associated class and the time-stamp data; and utilizing the fusion data to output a heat map on an overlaid image of the environment utilizing the multi-layer spatial maps, wherein the heat map includes information indicative of an associated health of a specific component of the machine utilizing the fusion data.

12. The computer-implemented method of claim 11, wherein the classifying is conducted at a remote server in response to communicating the signals utilizing a wireless transceiver.

13. The computer-implemented method of claim 11, wherein the classifier is configured to be trained to identify a machine fault or normal condition utilizing the signals.

14. The computer-implemented method of claim 11, wherein the classifier is detected utilizing a majority vote.

15. A system for monitoring automated robotic system, comprising:
one or more sensors installed in proximity to a machine configured to collect raw signals associated with an environment of the machine, wherein the one or more sensors includes one or more of a microphone, camera, radio frequency transceiver, inertial movement unit (IMU), or an accelerometer, wherein the raw signals include multi-layer spatial maps that include time-stamp data;
a processor in communication with the one or more sensors, wherein the processor is programmed to:
receive one or more raw signals collected from the one or more sensors;
denoise, utilizing a filter, the one or more raw signals to obtain a pre-processed signal;
extract one or more features from the pre-processed signals, wherein the one or more features are associated with the signals from the microphone, camera, radio frequency transmitter, IMU, or the accelerometer;
identify either a normal condition associated with the environment or an anomaly associated with the environment utilizing the one or more features to an associated class, wherein the anomaly is detected in response to a deviation from a threshold associated with the one or more features;
create fusion data by fusing the one or more features utilizing the anomaly detected; and
output a heat map on an overlaid image of the environment, wherein the heat map includes information indicative of an associated health of a specific component of the machine utilizing the fusion data.

16. The system of claim 15, wherein the anomaly is further detected utilizing the fusion data.

17. The system of claim 15, wherein the anomaly is detected utilizing the signals.

18. The system of claim 15, wherein the anomaly is detected utilizing DB Scan, K-means, agglomerative clustering, spectral clustering, one-class SVM, Gaussian Mixture Model, or auto-encoders.

19. The system of claim 15, wherein the signal includes either a two-dimensional or a three-dimensional spatial map.

20. The system of claim 15, wherein the spatial map includes both a two-dimensional and a three-dimensional spatial map.

* * * * *